United States Patent
Castro

(10) Patent No.: US 6,410,069 B1
(45) Date of Patent: Jun. 25, 2002

(54) METHOD FOR DECONTAMINATING A DRUPE

(76) Inventor: Efren Castro, 80800 Avenue 60th, La Quinta, CA (US) 92253

( * ) Notice: Subject to any disclaimer, the term of this patent is extended or adjusted under 35 U.S.C. 154(b) by 0 days.

(21) Appl. No.: 09/448,799

(22) Filed: Nov. 24, 1999

Related U.S. Application Data

(62) Division of application No. 09/126,470, filed on Jul. 30, 1998, now Pat. No. 5,992,310.

(51) Int. Cl.$^7$ .............................................. A23L 1/015
(52) U.S. Cl. ........................ 426/484; 426/485; 426/481; 134/25.3
(58) Field of Search ................................ 426/481, 484, 426/485; 99/516, 490, 536, 559, 565, 544, 547, 494; 134/25.3, 129, 144, 22.1, 22.11, 24, 152, 166 R

(56) References Cited

U.S. PATENT DOCUMENTS

| | | | | |
|---|---|---|---|---|
| 1,282,402 A | * | 10/1918 | Fenn ........................... | 426/484 |
| 1,796,878 A | * | 3/1931 | Watson | |
| 2,117,648 A | * | 5/1938 | Bottorf | |
| 2,219,832 A | | 10/1940 | Ashlock ...................... | 146/19 |
| 3,030,995 A | * | 4/1962 | Shrewsbury ................. | 426/484 |
| 3,080,265 A | * | 3/1963 | Maasberg | |
| 3,411,556 A | | 11/1968 | Margaroli ..................... | 146/27 |
| 4,002,774 A | * | 1/1977 | Chan, Jr. ..................... | 426/484 |
| 4,204,467 A | * | 5/1980 | Peters ......................... | 99/494 |
| 4,313,373 A | | 2/1982 | Fehlmann .................... | 99/549 |
| 5,102,678 A | * | 4/1992 | Plant et al. .................. | 426/481 |

FOREIGN PATENT DOCUMENTS

SU           1711793     * 2/1992

* cited by examiner

*Primary Examiner*—Milton I. Cano
*Assistant Examiner*—Robert A. Madsen
(74) *Attorney, Agent, or Firm*—Alfred D. Lobo

(57) ABSTRACT

A drupe which is infested with a larva of a moth or larvae of other insects, and is contaminated with related excretions, referred to as a "frass", in a central zone within the drupe, is cleansed with a longitudinally bored pitting knife mounted in the pitting head of a conventional pitting machine. A source of cleansing fluid is connected to the bore within the knife and fluid is discharged through radial passages in the knife, which radial passages communicate with the longitudinal bore. In operation, while the knife pits the drupe, fluid discharged from within the knife contacts the walls of the passage left by the ejected pit, and removes the frass. If desired, the drupe may be first pitted, then decontaminated or washed, and/or dried sequentially, in separate stages. The invention is particularly effective with dates, prunes, olives, cherries, nectarines, peaches and avocados.

7 Claims, 4 Drawing Sheets

METHOD FOR DECONTAMINATING A DRUPE

This is a division of patent application Ser. No. 09/126,470 filed on Jul. 30, 1998, now U.S. Pat. No. 5,992,310.

FIELD OF THE INVENTION

Apparatus for pitting a whole drupe with a pitting knife which removes the pit or stone by forcing it through the body of the drupe. The term "drupe" refers to a fleshy fruit or vegetable such as a peach, plum, date, cherry, avocado or olive, usually having a single hard stone (or "pit") that encloses a seed. More particularly, the invention provides at least one knife having a novel structure designed to provide a method for removing undesirable contaminants from within a generally axial passage left when a drupe is pitted. Such contaminants include the eggs of an insect such as a moth, or larvae of the insect, or the excretions of the larvae left during the period of their development, until the larvae can leave as a moth. These contaminants are not removed from within the passage formed by currently available or known pitting machines.

BACKGROUND OF THE INVENTION

Machines which automatically pit a drupe have laid the foundation for an agribusiness which makes it possible for a person with even less than average income to enjoy fruits and vegetables which would otherwise be consumed only by the wealthy. Such machines are the subject of U.S. Pat. Nos. 2,157,518; 2,219,832; 2,630,205; and 2,688,352 to Ashlock, Jr.; of U.S. Pat. Nos. 3,153,473; and 3,556,281 to Margaroli et al.; and of U.S. Pat. Nos. 4,090,439 and 5,577,439 to Chall et al. and Cimperman et al., inter alia. Such machines have successfully achieved in the U.S. what is still done manually in countries where human labor is relatively inexpensive.

In the aforementioned pitting machines, a pitting knife or an assembly of plural pitting knives in a pitting head, cuts through the skin and flesh of the drupe being pitted, ejects the stone, and is then retracted leaving a substantially central passage in the drupe.

When a moth chooses a drupe to nurture its progeny, it lays its eggs on or near the drupe, typically on its upper surface. The eggs progress to the larva stage. The time it takes an egg to get the larva stage typically corresponds uncannily to the period during which the drupe ripens. As the drupe ripens, its a portion of skin immediately surrounding its stem, tends to pull away from the stem and at some stage, may do so, leaving a narrow passage through which a larva burrows its way into the flesh of the ripe drupe. The larva feeds on the ripe flesh of the drupe, and as the larva matures, its excretions, referred to as "frass", build up within the now contaminated drupe. When the contaminated drupe is harvested and pitted, the frass, if not the larva itself, is left behind in the passage within the pitted drupe because a pitting knife cannot remove the frass even if it successfully ejects the larva with the pit.

United States Standards for Grades of Dates specifies a defect when an unacceptable percentage of dates are "affected by insect infestation—presence of dead insects, insect parts, or excreta "frass" (no live insects are permitted)."

A typical harvest may include from relatively few, to an economically disastrous percentage of contaminated fruit, and the extent of contamination can only be estimated by inspecting a large number of individual fruits. To date, when contamination is extensive, contaminated fruit has been disposed of as garbage, because there is no economical method of decontaminating the fruit. Worse, since it is currently impractical to sort contaminated fruit from uncontaminated fruit, marketable fruit is discarded along with the contaminated fruit.

When contamination is not extensive, the problem of removing the contaminants from within a pitted drupe has been addressed, unsuccessfully for the most part, by soaking the fruit in water, or passing the pitted fruit under a cascading stream of water, with the faint expectation that some of the water will enter the pit-free passage and flush away the frass. Besides being only marginally effective, both methods result in dissolving or otherwise sacrificing an unacceptably large portion of a fruit, such as a date or a prune, which typically has a relatively high water-soluble sugar content.

A pitting knife is usually made from hard stainless steel. Typically, plural pitting knives are mounted in a knife assembly held within the confines of a pitting head which houses the driving mechanism for timing and thrusting the knives into rows of fruit individually held in chucks, which are in turn, mounted on carriers carried by a conveyor belt. One does not expect to use a pitting knife for any purpose other than its designated purpose. One does not consider boring a pitting knife. Nevertheless, this invention does so; and thereby provides for contacting the walls of the passage of a pitted drupe with a decontaminating quantity of a decontaminant fluid, thus providing an effective solution to the problem of drupes internally contaminated with contaminants such as "frass".

SUMMARY OF THE INVENTION

It has been discovered that a pitting knife for a drupe may be provided with a longitudinal bore through which a decontaminant or cleansing fluid is discharged in a generally radial direction (relative to the longitudinal axis of the knife) to cleanse a pitted drupe. Use of the fluid during pitting has the added benefit of minimizing build-up of particles and remnant pieces of fruit adhering not only to portions of the pitting head but also to the chucks of fruit holders carried by the conveyor.

It is therefore a general object of this invention to provide an elongated pitting knife having a longitudinal bore and at least one generally radially extending bore in open communication with the axial bore and the knife's outer surface; and means for supplying an effective quantity of decontaminant fluid to the axial bore, the fluid being under sufficient pressure to be ejected generally radially from the knife so as to contact the walls of the pitted passage.

It is a specific object of this invention to provide an assembly of plural knives each having an axial bore; the knife essentially simultaneously pits plural drupes to leave a pitted passage in each, and cleanses the passage; the assembly is connected with a means for supplying a decontaminant fluid to the knives; the fluid flushes each passage with sufficient cleansing fluid to remove contaminants from the passage.

It is also a specific object of this invention to provide (i) an assembly of plural conventional pitting knives which together first pit drupes to leave a pitted passage in each, and, (ii) an assembly of cleansing rods positioned after the assembly of pitting knives, which cleansing rods supply sufficient decontaminant fluid discharged under sufficient pressure to contact the walls of the passage left by the ejected drupe and cleanse them. "Cleansing rods" are longitudinally-bored pitting knives having the primary function of providing cleansing fluid, rather than a cutting function. Cleansing rods are so termed, rather than "cleansing knives", to emphasize the cleansing function, and to distinguish over "pitting and cleansing knives" which also have a cleansing function. Such sequential pitting and cleansing may be accomplished in a single pitting head, or in multiple pitting heads arranged serially along the path of the conveyor for the carriers. Alternatively, in another sequential operation, a first set of plural rows of pitting and cleansing knives may be succeeded by a second set of plural rows of cleansing rods the function of which is to provide a moisture-removing gas ("drying gas") from within pitted and cleansed passages. The cleansing rods thus function as "drying rods". As before, the pitting and cleansing knives, and drying rods, may be mounted in a single assembly in a single pitting head, or for sequential operation, in two assemblies in separate pitting heads.

It is another specific object of this invention to provide a method for decontaminating a drupe which is internally contaminated, comprising, inserting a pitting knife within the drupe, ejecting a pit from within the drupe leaving a passage therewithin, flowing a decontaminant fluid through the pitting knife, and, ejecting the fluid in a generally radial direction, to contact walls of the passage, thereby flushing out contaminants; the fluid may be a liquid, or a gas, or a mixture thereof; the liquid may be water or an aqueous decontaminant, e.g. a solution of hydrogen peroxide; the gas may be ozone.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Figure 1:
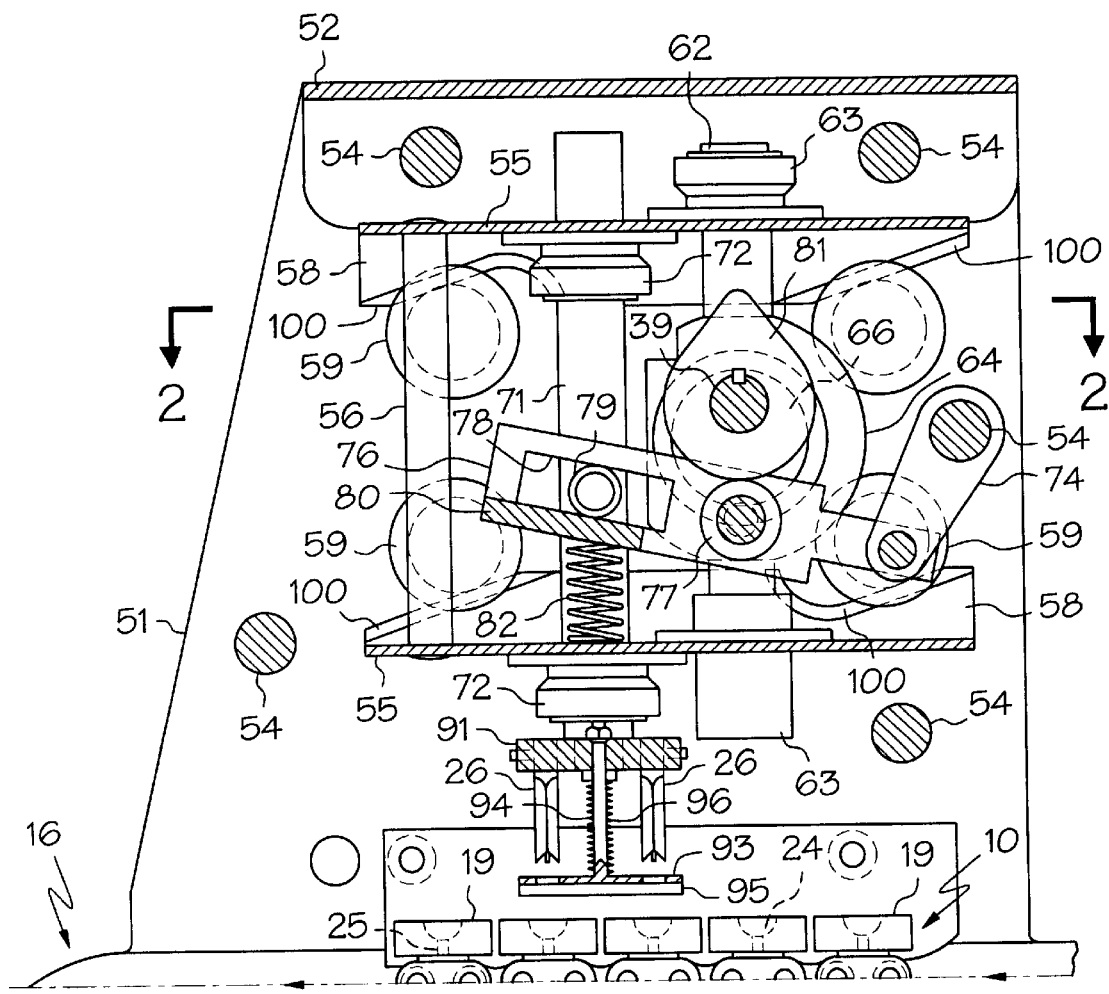
FIG. 1 is a side elevation diagrammatically illustrating a pitting mechanism and a portion of a conveyor means carrying rows of carriers.

The invention is described herebelow with particular reference to decontaminating dates contaminated with frass, and to pitting knives used in commercially available machines for pitting dates. It will be appreciated that the invention extends to any drupaceous fruit or vegetable prone to contamination in a zone contiguous to the drupe's stone. Frass is introduced by an external source such as an insect, and is deposited in a zone surrounding the stone or pit. No claim is made to the overall machine but only to the pitting and cleansing knife and the assembly of pitting and cleansing knives, and the method for decontaminating the drupe using a cleansing rod which is inserted within a pitted drupe.

A conventional pitting machine holds each drupe in a chuck. To date, a highly favored machine such as the one described in U.S. Pat. No. 3,556,281 uses plural chucks aligned in a carrier or fruit holder, and plural carriers are secured in a chain-driven endless conveyor means. A pitting head, positioned near one end of the conveyor, thrusts an assembly of pitting knives downwardly; each knife is thrust into a fruit held above a pitting rubber in a chuck so that the knives are in one-to-one correspondence with each fruit as it goes through the flesh of each fruit to eject its pit. The pitting head and conveyor are driven by a motor with inter-connecting speed reducer and drive sprockets mounted on shafts journalled for rotation in the side members (plates) of the frame. The pitting head or guideway for the pitting mechanism is moved forward in the direction of advance of the carrier, and at the same time, the guideway is advanced downwardly toward the carrier, to allow the pitting mechanism to pit fruit on the carrier. The pitting mechanism thus moves horizontally forward over the carriers and conveyor at a rate such that the pitting mechanism is held directly above a selected carrier. While so held, the mechanism is lowered to engage and pit fruit on the carrier, thereafter being raised out of engagement, whereupon the head is returned to a point of beginning, from which the pitting head is again moved forward above another carrier. This operation is explained in detail in the '832 patent and will be summarized hereunder in relation to the drawing taken from the '832 patent only to provide a clear understanding of the framework within which my invention operates.

Figure 2:
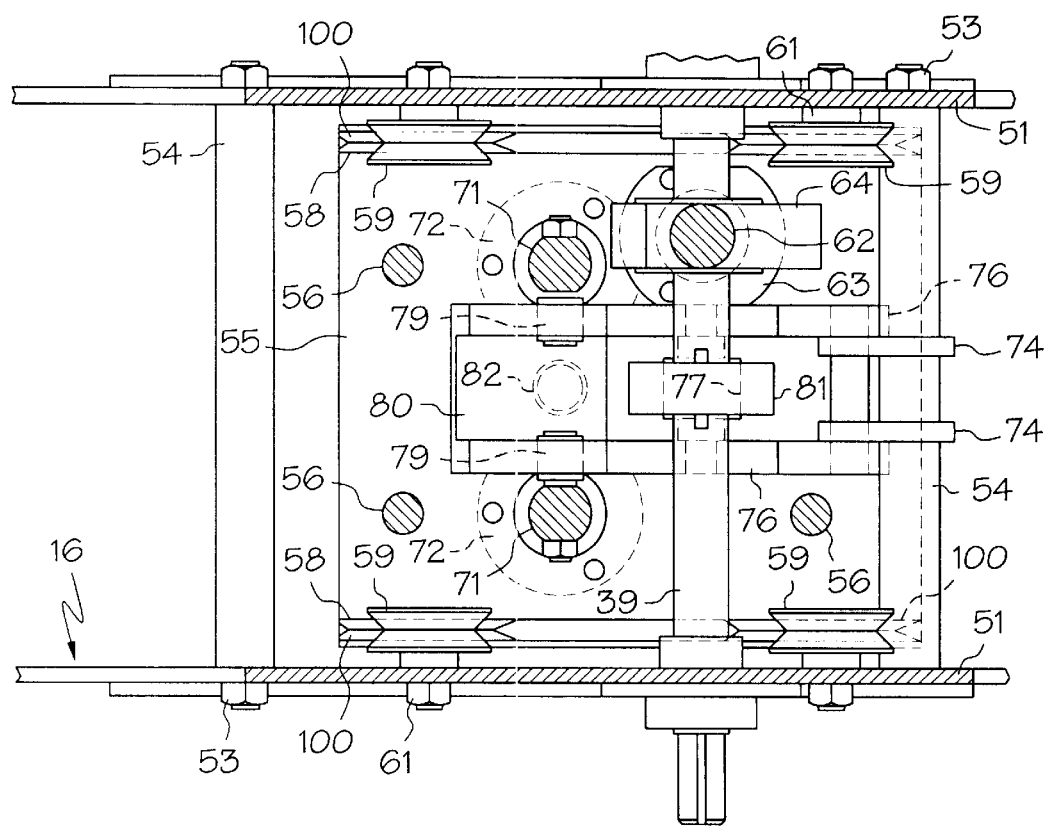
FIG. 2 is a section taken along the lines 2—2 of FIG. 1 providing a plan view a pitting mechanism and a portion of an endless conveyor carrying a multiplicity of carriers.

Operation with an assembly of pitting and cleansing knives for substantially simultaneous pitting and cleansing:

Referring to FIGS. 1 and 2, a conventional pitting machine such as one described in the '832 and '281 patents, includes an endless chain-drive conveyor 10 carried within a frame 16. Secured on the conveyor are plural fruit carriers or holders 19 each having several chucks 24 within each of which an individual date (not shown) is held, typically with its major axis in a vertical plane. Details of a holder and the spring-actuated chucks are disclosed in the '281 patent. Each knife 26 is elongated having a mounting end and a terminal end which is thrust through a date and against the pit within it. When knives 26 are lowered further, each knife pushes the pit out of the date, and through a passage 25 in a rubber member of the fruit carrier 19.

Oppositely disposed, vertical side members 51 are supported on frame 16 and connected above by member 52. The pitting mechanism is supported by rods 54 through the side members 51 and secured with nuts 53. Between the side plates 51 is a head or guide structure which includes horizontal plates 55 spaced apart by spacers 56. Each plate near opposed sides thereof, carries a V block 58 engaged with V rollers 59 journalled for rotation on stub-shafts 61 secured in each side member 51 in a horizontal plane. The V blocks and V rollers support the head structure provided by plates 55 for a reciprocating movement between the side members, toward and away from the carrier structure.

A vertical shaft 62 slidably held in bearings 63 in plates 55 allows the head structure to be reciprocated due to an eccentric follower 64 carried by the shaft 62. Within the eccentric follower 64 is an eccentric 66 rotated by shaft 39. Shaft 39 is driven by a suitable drive mechanism (not shown) so that upon rotation of shaft 39, eccentric 66 reciprocates the head structure over an angular path.

Each V block 58 has an angular V section 100 which engages an associated supporting V roller. The V block surfaces are positioned so that the head reciprocates toward and away from the carrier.

The pitting head structure includes two plungers 71 journalled in bearings 72 secured to plates 55. Near rod 54 carries fixed arms 74 which extend to provide support for spaced levers 76 between which is mounted cam follower 77. Each spaced lever 76 is slotted near its distal end to provide slots 78 within which rollers 79, carried upon plungers 71, are rotatably engaged. Cam follower 77 is maintained in engagement with cam 81 carried on shaft 39, spring 82 engages pad 80, which joins levers 76, the spring urging levers 76 clockwise in FIG. 1 so that the cam follower engages the cam at all times.

Extending between plungers is a mounting plate 91 which carries an assembly of pitting knives 26 arranged in successive rows, in the direction of travel of the conveyor, the number of knives in each row across plate 91 corresponding to the number of chucks in each carrier. This arrangement ensures that dates held in plural carriers are pitted substantially simultaneously.

As shown, but not necessary for operation, is a cleaning plate 93 yieldably secured to mounting plate 91 by bolt 94, springs 96 urging the plate 93 away from plate 91. The pitting knives advance through apertures in the cleaning plate 93, engaging fruit held in the chucks of the carriers. Extensions 95 on mounting plate 91 engage the carriers and move with them. When the pits are pushed through apertures 25 in the carriers, the knives are cleaned by the plate 93 as they are withdrawn.

Figure 3:
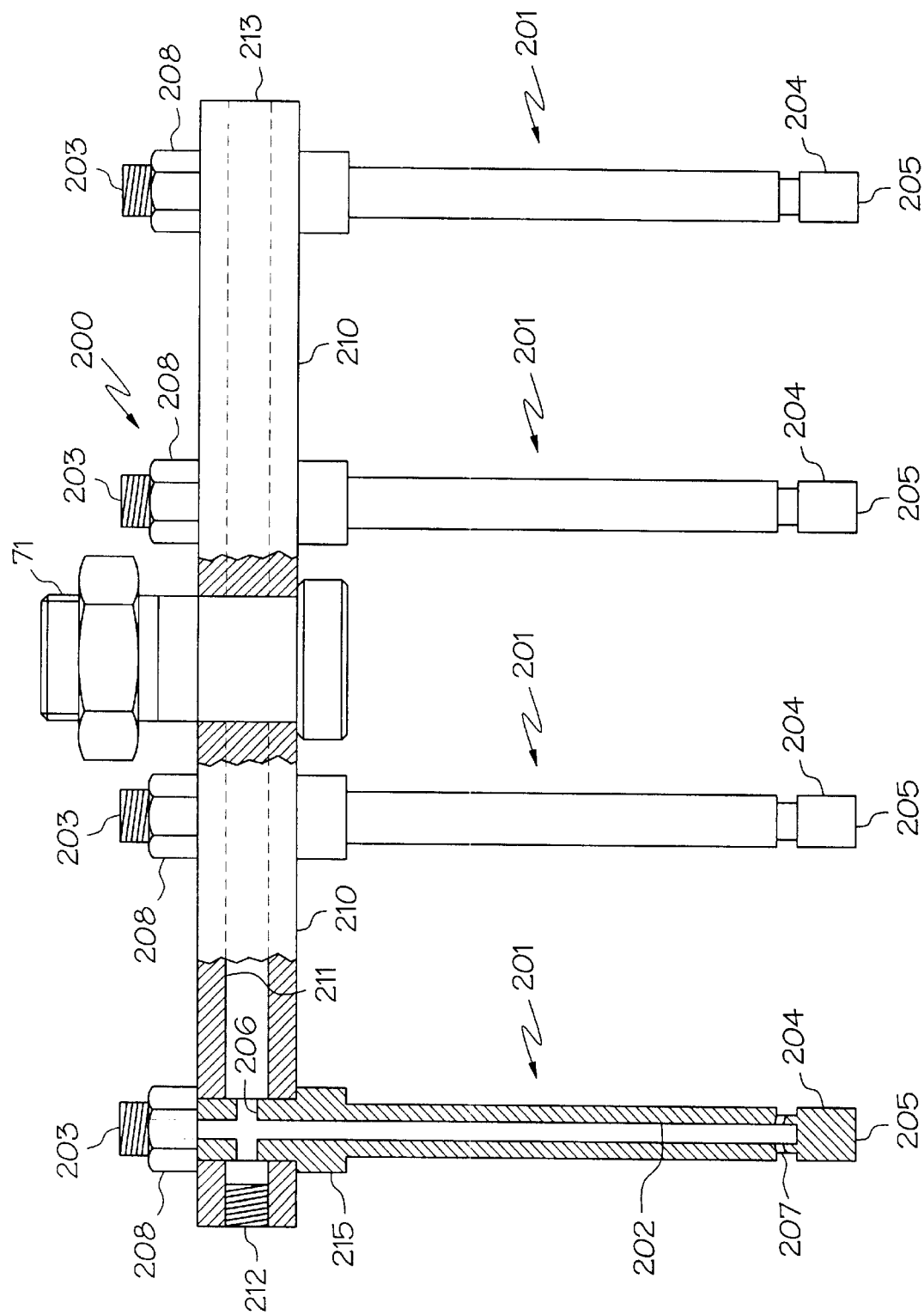
FIG. 3 is an end elevation view of an assembly of pitting knives, each knife, one of which is shown in cross-section, having a longitudinal axial bore terminating at its lower end, and plural, generally radially extending bores in open fluid communication with the longitudinal bore.

Referring to FIG. 3 there is shown an end elevation view, that is, viewed from the discharge end of a conveyor carrying fruit holders, an assembly, referred to generally by reference numeral 200, of pitting and cleansing knives 201 removably securely held in a plate 210 carried by plungers 71 in a pitting machine more fully described in the aforementioned '281 patent. The conveyor is fitted with 4 chucks in a row, equidistantly spaced-apart along a lateral axis (at right angles to the horizontal axis), and the assembly 200 includes 8 pitting and cleansing knives 201 arranged in 2 rows, each row with 4 knives, one to be centered above and thrust through each chuck.

Each knife 201 for pitting dates is preferably a stainless steel cylindrical rod having an outside diameter (o.d.) of about 9 mm, the length being chosen according to the particular dates being pitted. For Deglet dates, the overall length of the knife is about 12.5 cm. For pitting prunes a knife is about 13 mm in diameter and has an overall length of about 12.5 cm. Near the knife's mounting end (upper end) 203 it is threaded, and the knife's fruit-cutting end 204 has a bottom cutting face 205 which is inwardly concave. The radius of the concave face is not narrowly critical being sufficient to provide a periphery which lends itself to being sharpened. Preferably, the periphery of bottom face 205 is sharpened to a knife-edge, to facilitate cutting through each date cleanly. The geometry of the cutting face 205 of the knives' ends is not narrowly critical, and the end could be star-shaped as described in the '832 patent. Each knife is slidably inserted through a vertical passage in plate 201 and removably tightly held by a nut 208. The plate 201 is also provided with two lateral through-passages 211, spaced apart so that the cross-bores 206 in each row of knives are aligned in each passage. At least one of the opposed ends 212 of each passage 211 is threaded to permit connection with a source of decontaminant fluid, and if only one end is threaded, the other end is plugged. Preferably both ends 212 and 213 are threaded so that fluid can be fed from both ends of each passage 211.

Each knife is provided with a longitudinal axial bore 202 the lower end of which terminates above the cutting face 205, the upper end of the bore 202 being plugged in the threaded end 203. It will be appreciated that the function of the longitudinal bore 202 is unrelated to its location being axial, the function being to supply fluid to one or more radially directed bores, but for ease of machining, the bore is axial. Each knife is also provided with a through crossbore 206 which is aligned within, and in open fluid communication with bore 211 of the plate 210. To assist in registering the cross-bore 206 with the lateral bore 211, the knife is provided with a circumferential shoulder 215 the upper surface of which is abutted against the lower surface of the plate 210.

Near the lower terminal end of bore 202, each knife is provided with at least one, and preferably plural radially extending through passages 207 which are in open fluid communication with the bore 202. Where the end of the knife is star-shaped, a radial bore is provided in, or directly above each radiating member of the star. Preferably 4 such passages 207 are provided, each spaced apart by 90°, so that fluid from the bore 202 can be discharged radially outwards from the surface of the knife. Preferably, the radial bores are angulated, either downwards or upwards, most preferably downwards, from the lateral plane in the range from about 5° to about 65° so that the discharge from each bore contacts the wall of the pitted date at a downward angle.

It will be evident that axial bore 202 does not extend through the bottom cutting face 205 because squirting fluid directly downwards does not serve to cleanse the walls of the passage in a pitted date. However, it may be found that a small quantity of such directly downwardly squirted fluid helps to minimize the build-up of date remnants in passages 25 of the fruit holders. In such an event, if a downward discharge is desirable, it must be kept in mind that the diameter of the bore 202 near the bottom face will preferably be relatively smaller than the diameter of a radial bore 207 so as to permit the radial bore 207 to supply an effective amount of cleansing fluid.

To pit and simultaneously cleanse dates while they are being pitted, the 9 mm (11/32 inch) knives are preferably provided with an axial bore 202 having a diameter of about 3 mm (1/8 inch) and 4 radial bores each 1.6 mm (1/16 inch) diameter. In general, the sum of the areas of the cross-sections of the radial bores is about equivalent to the area of the cross-section of the axial bore.

In the assembly 200 of the '832 and '281 machines, spatial constrictions in the pitting head dictate that fluid be supplied through the plate 210. In an instance where such constriction does not apply, e.g. for knives held in a mount member in a pitting turret such as described in the Cimperman et al '439 patent, fluid may be supplied directly to the knife through a connection to the upper end of the longitudinal bore 202, and no cross-bore is required in the knife.

Figure 4:
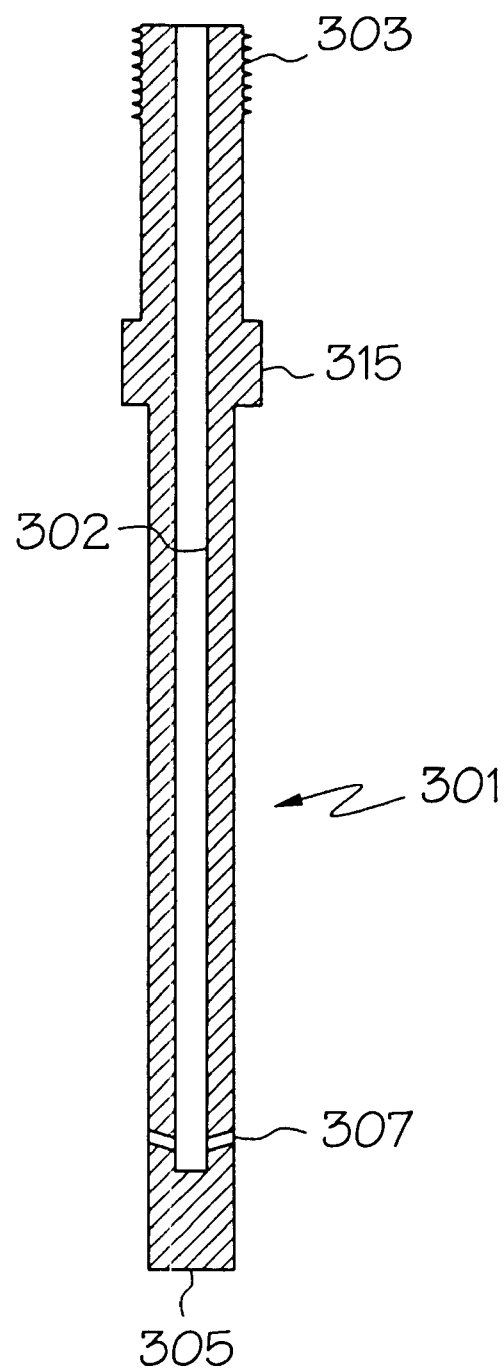
FIG. 4 is an end elevation view of a single pitting knife for use in a pitting head in which a single pitting knife is mounted, and in which head a connection to a source of fluid at the upper end of the knife is not restricted.

Referring to FIG. 4 there is illustrated a cross-section view of a single knife 301 to be mounted in a pitting turret in which individual knives 301 pit dates sequentially. As before, preferably each knife 301 is cylindrical and is provided with a longitudinal axial bore 302, but axial bore 302 does not extend through the bottom cutting face 305. Near the lower terminal end of bore 302, each knife is provided with at least one, and preferably plural radially extending through passages 307 which are in open fluid communication with the bore 302. Preferably 4 such passages 307 are provided, each spaced apart by 90°, so that fluid from the bore 302 can be discharged radially outwards from the surface of the knife; preferably, as before, the radial bores are angulated in the aforesaid angular range, and shown angulated upwards in this knife, so that the discharge from each bore contacts the wall of the pitted date at an upward angle. Each knife is preferably provided with a circumferential shoulder 315 the function of which is to help mount the knife in the pitting turret so that the knife is directed in a vertical direction.

In the foregoing operation for simultaneous pitting and cleansing, the pitting head thrusts the knives into and through dates held in the chucks of the fruit holders while fluid is being supplied to the knife assembly. All knives in the assembly are lowered into contact with the dates beneath and travel with them until the pits are ejected and the remaining passages cleaned while the pits are being ejected and upon withdrawal of the knives from the dates. Though water is typically the cleansing liquid used to remove frass, some forms of frass may be amenable to removal with a cleansing gas such as air, or air mixed with ozone. When a cleansing gas is effective, it provides the advantage of not wetting the internal passage left by the ejected pit. One skilled in the art will recognize that the dimensions of a pitting and cleansing knife, or of a cleansing rod, will be chosen depending upon the length of the axis (in the vertical direction) of the particular drupe being pitted, the diameter of the pit, and the pitting machine in which the knife or rod is to be used.

Substantially simultaneous pitting and cleansing with individual knives operating sequentially:

If desired, where individual drupes, e.g. dates or prunes, are to be pitted sequentially in a pitting turret such as is described in U.S. Pat. No. 5,577,439, a single pitting and cleansing knife 201 may be secured in a mount member held in a pitting turret (identified as 2A and 12 respectively in the '439 patent) wherein eighteen identical pitting knives (identified therein by reference numeral 6), each pitting knife mounted in a cylindrical, vertically oriented, channel 2B (shown in FIG. 21 of the '439 patent) through mount member 2A.

Operation with a single assembly of pitting knives and cleansing rods for sequential pitting and cleansing:

For first pitting, then cleansing the pitted dates, conventional pitting (only) knives may be used in a first row of plural knives, preferably in a first set of plural rows, and cleansing rods, or pitting and cleansing knives (which would provide primarily a cleansing function since the fruit is pitted by the preceding pitting knives), are used in the subsequent second row of plural rods, or second set of plural rows of rods, which would be positioned nearer the discharge end of the conveyor than the last row of pitting knives and downstream thereof. In this arrangement, fluid is supplied to the second row (or second set) of cleansing rods only, the mounting plate being bored accordingly. The first set of conventional pitting knives are conventionally mounted in the mounting plate. It is unnecessary to have the bottom faces of the cleansing rods sharpened as these rods primarily provide a cleansing function and essentially no cutting function. Thus, in cross-section, such cleansing rods appear to be identical to a pitting and cleansing knife, except for the concave bottom with its (pitting knife's) sharpened periphery.

Though pitting may be effected with a conventional pitting knife, such as a star-shaped one, it is most preferable to use a cylindrical pitting knife having a concave pitting face on its pitting end, with the periphery of the face sharpened to cleanly cut through the skin and flesh of a drupe to be pitted. The radius of the concave surface is not narrowly critical being chosen approximately to overlap the longitudinal cross-sectional area of the pit in a drupe to be pitted. In a 9 mm diameter pitting knife for a typical date, the length of the pitting knife is about 12.5 mm (4") and the radius of the concave face is in the range from about 9 mm to 30 mm.

Since the function of a cleansing or drying rod is primarily to discharge the desired fluid against the walls of the passage within a pitted drupe, the rod's length is not narrowly critical provided it enters the passage. Preferably the length is long enough to traverse the length of the major axis of the drupe. Its body is provided with a longitudinal, preferably axial, bore and one or more radial bores, as is a pitting and cleansing knife.

Operation with dual assemblies of pitting knives and cleansing rods for sequential pitting and cleansing:

Instead of pitting and cleaning in a single pitting head, it may be desirable to extend the horizontal section of the conveyor so as first, to pit dates in a conventional pitting head and thereafter cleanse the pitted dates in a separate cleansing head which is essentially the same as the first pitting head except that only cleansing rods are used. The operation of the machine would be similar to operation with a single pitting head, except for additional interconnecting chain drives and sprockets which time the operation of the second head in the same manner as the timing of the first head.

Operation with a single assembly of (i) pitting and cleansing knives and (ii) of drying rods, for simultaneous pitting and cleansing and sequential drying:

In some instances, it may be necessary to dry fruit which has been pitted and internally cleansed. Fruit, especially dates, internally cleansed with liquid retains enough moisture within the cleansed passage to slow down the drying of the pitted dates to meet moisture content specifications. Since the difficulty of drying is attributable mainly to liquid held within the cleansed passage, it may be desirable to contact the walls of the passage with a drying gas to accelerate drying of the pitted dates. To do so, a single assembly of knives may include a first row of plural axially bored and cross-bored pitting and cleansing knives, or a first set of plural rows thereof, followed by a subsequent second row of plural drying rods, or second set of plural rows of drying rods, which (second row or second set) would be positioned nearer the discharge end of the conveyor than the last row, and downstream thereof. In this arrangement, cleansing liquid is supplied to the first row (or first set), and a drying gas is supplied to the second row (or second set). The drying gas is supplied under sufficient pressure to remove enough moisture from within the passage so as not to delay conventional drying of the dates.

Choice of Fluid:

The choice of decontaminant fluid depends upon the particular nature of the contaminant to be cleansed and the degree of cleansing desired. Where frass is to be flushed out, clean water is preferred. However, if some degree of bacterial "kill" is desired, the decontaminant fluid may be a bacteriostatic or bactericidal solution of hydrogen peroxide, the concentration of which being chosen in accordance with the degree of "kill" sought. Alternatively, the decontaminant fluid may be a bacteriostatic or bactericidal gas, for example steam or ozone, or a mixture of such a gas and air. Still another alternative is the use of a mixture of liquid and gas, neither of which, or, one or both of which, may be bacteriostatic or bactericidal.

The amount of decontaminant fluid used should be sufficient to flush away frass and/or any other contaminant which adheres to the inner walls of the passage left in the pitted dates. Typically, water is supplied to each 212 and 213 end of the bores in the plate 210 at elevated pressure, preferably in the range from about 170 kPa (10. psig) to 790 kPa (100 psig), sufficient to flush away frass but insufficient to diminish the mass of the fruit significantly.

Where it is desired to dry wetted passages within pitted and cleansed fruit, a second set of plural knives may be used to do so in a manner analogous to sequential pitting and cleansing. Such drying is effected by contacting the walls of the passage with a drying gas under enough pressure and in an amount sufficient to force loosely adherent water from within the passage. For greater efficiency such drying gas may be bone-dry air which has been de-moisturized in a desiccator means.

Having described the longitudinally bored pitting and cleansing knife, an assembly of such knives, and the overall process of using the invention in detail, and having illustrated the invention with specific examples of the best mode of making the knife and using it to pit and cleanse drupes, particularly dates, it will be evident that the invention may be used in a wide choice of combinations depending upon the drupe to be pitted or de-seeded and the contaminant to be removed; and that the invention has provided an effective solution to an old and difficult problem. It is therefore to be understood that no undue restrictions are to be imposed by reason of the specific embodiments illustrated and discussed, and particularly that the invention is not restricted to a slavish adherence to the details set forth herein.

I claim:

1. A method of cleansing contaminants from within a drupe, comprising, (i) inserting a pitting knife within the drupe, (ii) ejecting a pit from within the drupe leaving a pitted passage therethrough, (iii) flowing a decontaminant fluid through a longitudinal passage in the pitting knife while the pitting knife is within the passage, and, (iv) discharging the fluid from the knife in a generally radial direction only, to contact walls of the pitted passage and remove the contaminants therein, such that contaminants within the passage are flushed out of the drupe.

2. The method of claim 1 comprising flowing the fluid while ejecting the pit.

3. The method of claim 1 comprising ejecting the pit in a longitudinal direction with a first pitting knife and thereafter flowing the fluid through a longitudinal passage in a cleansing knife while the cleansing knife is within the drupe.

4. The method of claim 1 comprising flowing the fluid through a first pitting knife inserted in the drupe while ejecting the pit in a longitudinal direction and thereafter flowing a gas through a cleansing knife in a generally radial direction only while the cleansing knife is within the drupe.

5. The method of claim 4 wherein the fluid is a liquid in a first set of pitting and cleansing knives carried in an assembly mounted in a pitting head; and, the fluid is a drying gas in a second set of cleansing rods carried in the assembly.

6. The method of claim 1 wherein the fluid is a liquid.

7. The method of claim 1 wherein the fluid is a gas.

* * * * *